Figure 11:
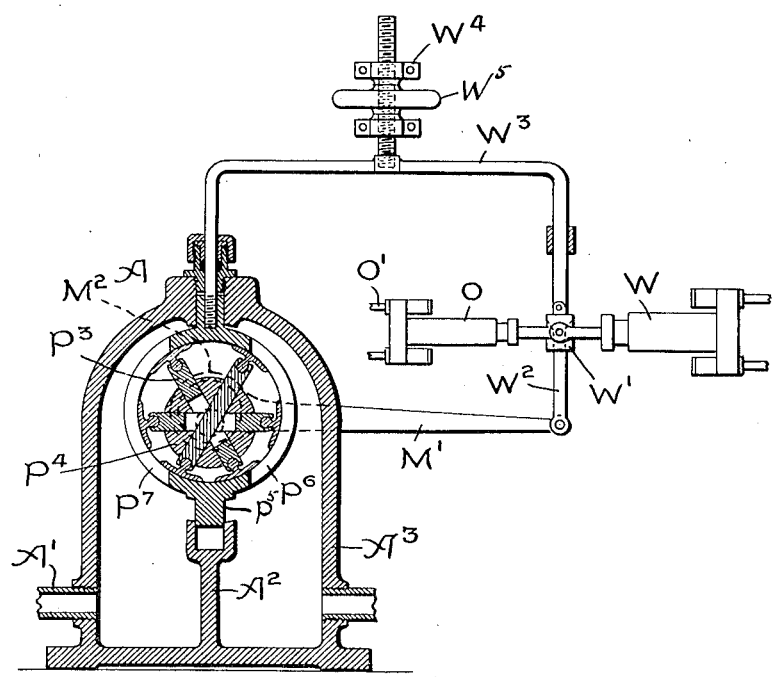

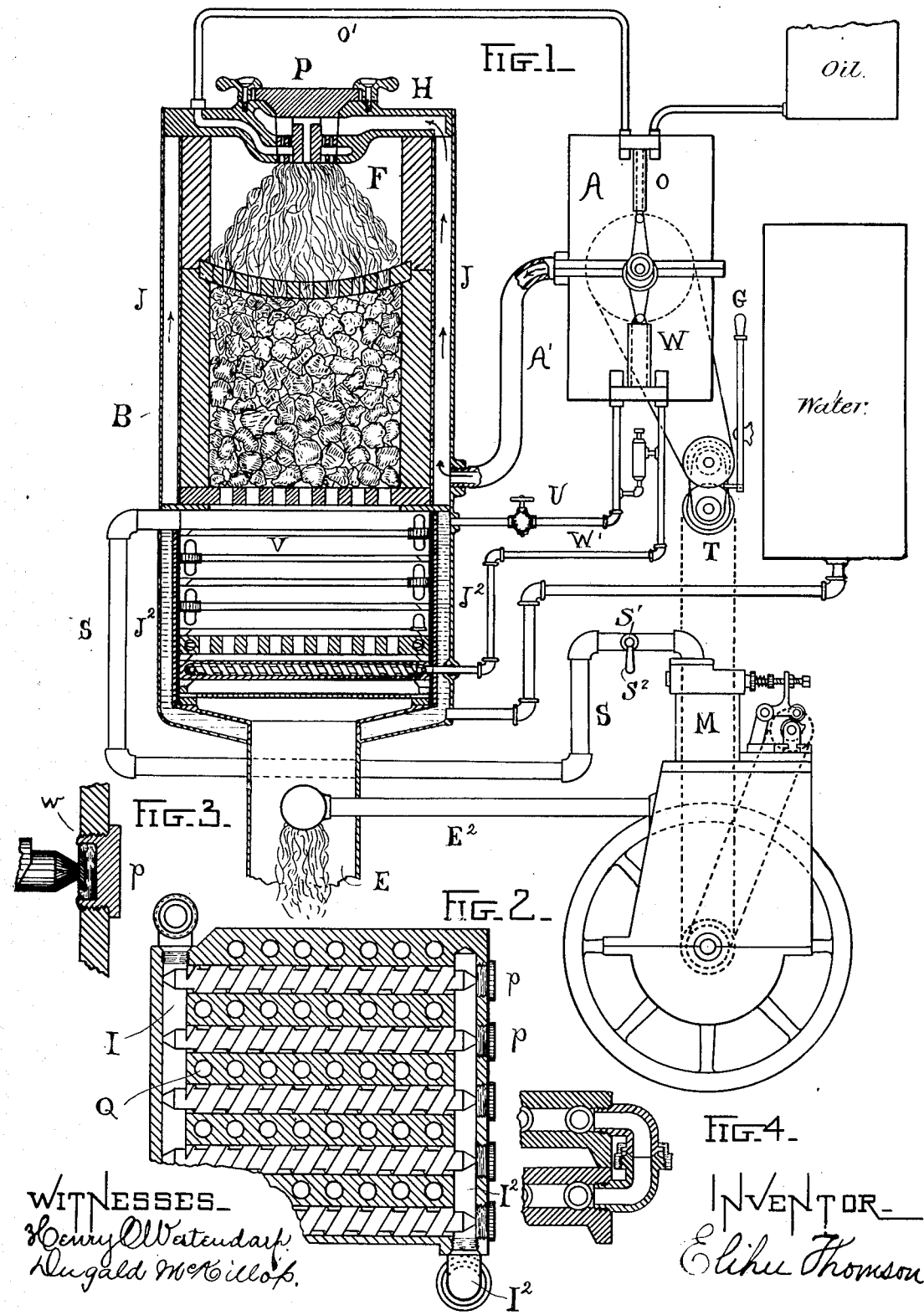

No. 892,196. PATENTED JUNE 30, 1908.
E. THOMSON.
STEAM GENERATING APPARATUS.
APPLICATION FILED JUNE 9, 1898.
3 SHEETS—SHEET 2.
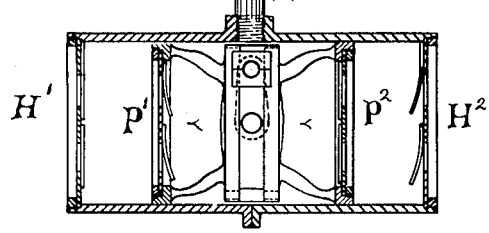
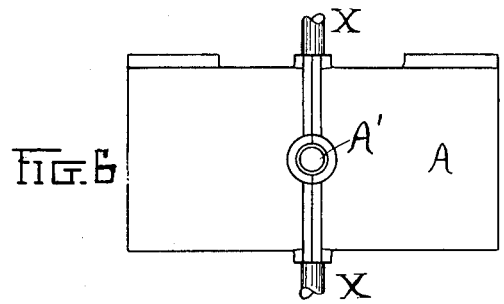
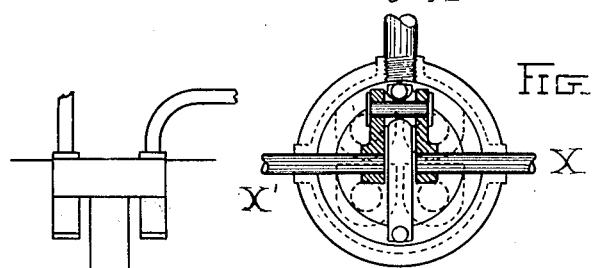
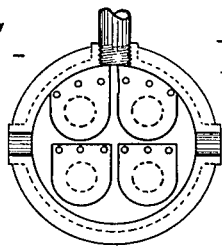
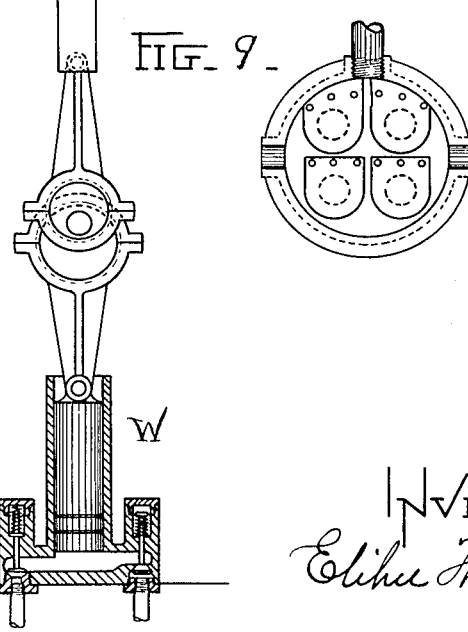
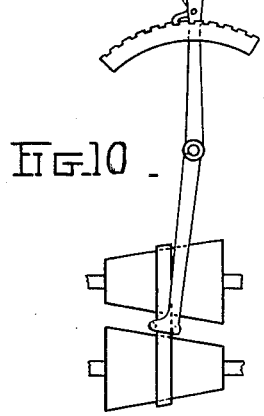
WITNESSES
INVENTOR
Elihu Thomson No. 892,196. PATENTED JUNE 30, 1908.
E. THOMSON.
STEAM GENERATING APPARATUS.
APPLICATION FILED JUNE 9, 1898.

3 SHEETS—SHEET 3.

Witnesses:
Marcus L Byng
Alex. F. Macdonald.

Inventor:
Elihu Thomson,
by Albert G. Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

STEAM-GENERATING APPARATUS.

No. 892,196.　　　Specification of Letters Patent.　　Patented June 30, 1908.

Application filed June 9, 1898. Serial No. 683,000.

*To all whom it may concern:*

Be it known that I, ELIHU THOMSON, a citizen of the United States, and resident of Swampscott, county of Essex, and Commonwealth of Massachusetts, have invented a new and useful Improvement in Steam-Generating Apparatus for Power and other Purposes, of which the following is a specification.

One object of my invention is to produce a safe, convenient, efficient and compact apparatus whereby liquid such as water may be vaporized at considerable pressure and applied for motive power, and to perform such action by means of liquid fuel such as kerosene oil burned under strictly economical conditions, and to conserve the heat of such combustion so perfectly as to obtain the highest economy.

A further object of my invention is to provide means whereby a steam-making apparatus may be produced suitable for use in automobile carriages and for such like purposes, where space and weight should be saved and where high efficiency is required in order to save the necessity for carrying heavy loads of water and fuel.

By my invention fuel may be consumed, even though it be kerosene oil, without producing any objectionable odors. My structure is not liable to explosion, since there is at no time a heavy charge or pressure of water under high temperature, or combustible with air. In my invention I secure perfect combustion, and I also obtain ability to reduce or increase the amount of combustible consumed, and therefore the amount of water vapor or steam produced at will, while retaining the relative proportions of air, combustible and water for vaporization. In the arrangement of my invention there is very little loss of heat from the walls of the apparatus, and no danger from fire, since there is no exposed flame or appearance of fire, as the combustion goes on in what is practically a closed chamber.

The means whereby I carry my invention into effect will be understood by reference to the accompanying drawings and description which follows, while the novel features thereof will be pointed out in the claims.

Figure 1 is a general scheme of the elements which together make up the system of my invention; Figs. 2, 3 and 4 are detail views of the vaporizer structure; Figs. 5, 6, 7 and 8 show a form of air pumping or blowing apparatus suitable for use in connection with my invention; Fig. 9 indicates set pumps for pumping the fuel and water used in the apparatus; Fig. 10 indicates means for varying the action of the air, fuel and water pumping devices; and Fig. 11 shows a means for varying the effective strokes of the pistons.

In Fig. 1, A represents suitable pumping apparatus delivering air through a pipe $A^1$ to a jacket or shell J, surrounding and nearly jacketing the inner shell lined with fire-brick or heat-resisting material. The air from the jacket J, heated by escape heat from the interior, is carried to the fire-head H, which is made with passages as shown, whereby the air is delivered and commingled with oil vapor produced by feeding oil to the pipe $O^1$ pumped simultaneously with the air by a pump O from a tank marked "Oil". The delivery of the air and oil is through a specially formed plug inserted in the head H, which forms the subject matter of a separate patent. The adjustment of the capacity of the pump O to the capacity of the air-pumping apparatus A is made such as to secure a proper chemical atmosphere for complete combustion in the fire space F surrounded by fire-brick. Assuming the fire started in F, the volume there developed passes through a mass of fire-resisting material in the interstices provided in such material, such as a mass of broken fire-brick B, Fig. 1, sustained by perforated plates of refractory material. The heat of combustion from fire in F is stored in B until the mass thereof becomes very highly heated, which results in the ability to extinguish or stop the action of the apparatus by stopping the feeding of oil and air while the heat in B is retained at such a high temperature for a long time that the apparatus can be again started by simply turning on the oil and air, or beginning the pumping thereof. The hot gases passing from B finally pass through the vaporizer proper, which is marked V, and after passing the vaporizer are discharged through a suitable opening marked E. The vaporizer is surrounded by a water jacket $J^2$ whereby any heat escaping through the walls of the inclosure which contains the vaporizer V may be utilized for heating the feed water. The feed water enters from a tank marked "Water", passes into the jacket J² and is taken therefrom by a pump W and delivered by a pipe W¹ to the vaporizer. The pump W acts to feed the water from the tank and is operated along with the oil and air pumps A and O. The capacities of the three pumps are so adjusted that the amount of combustible pumped in O meets the proper amount of air pumped by A to produce perfect combustion in the fire space F, and the amount of water pumped by W is such that it will be vaporized and superheated to the desired degree in the vaporizer V before delivery to the pipe S for operating the engine or other purposes. The engine may be of any suitable type for operation with the vapor or steam, and is marked M.

The vaporizer may be thus described. It consists of a mass of metal and a series of slabs of metal such as cast iron or cast copper alloy, shown horizontally in section in Fig. 2, and in vertical section in two planes at the lower part of the vaporizer V, (Fig. 1), where the pipe W¹ enters. Fig. 2 represents a boiler section comprising a flat cast slab having openings therein stopped by proper plugs $p$, $p$, etc. The openings form passages in multiple or parallel relation leading across the slab and connect the passage I with an outlet passage. These passages are closed by the plugs $p$, $p$, and preferably contain rods or tubes of metal having spiral grooves cut in their exterior, so as to form helical passages from one end to the other of the slab, through which water or vapor may be passed. Extending transversely to the passages containing the spirally grooved bars are many openings such as Q, which pass completely through the plate or slab from side to side, as is more clearly seen in the section next to the lower slab of the vaporizer V (Fig. 1), and permit the hot gases from the fire space F, through the material B, to find free movement and deliver their heat to the successive slabs in the vaporizer. The slabs are properly spaced apart so as not to permit any choking of the openings, and the openings Q in one slab are made to break joint with those in the next succeeding one, as by reversing or changing the position of the slabs relatively so as to cause the gases to pass through a broken or zig-zag course and thereby utilize all the heating surface available for picking up heat from the gases and delivering it to the metal of the slabs. Other constructions might be used for this purpose, the intention of which is to enlarge and extend the metal surfaces exposed to the friction of the moving gases. The series of slabs, of which seven are shown superposed in Fig. 1, and spaced apart, are jointed by suitable connectors as more clearly seen in Fig. 4, which consist of short bent couplings secured together and connecting the inlet passage or opening from one slab to the outlet of the next preceding.

Fig. 3 shows the preferred arrangement of the plugs $p$ which occupy the openings $w$ through which the grooved bars have been inserted. These plugs are made with an inner face of hard stone or other substance non-conducting for heat, and indestructible by hot vapor, such as hard-baked clay or the like. The object of this is to keep the plug $p$ as nearly the same temperature as the slab as possible so as to avoid its being cooled at any time and thereby leaking by contraction.

As shown in Fig. 1, an engine M driven by the vapor apparatus and delivery pipe S—S, is coupled by belting shown in dotted lines and a speed-varying mechanism T, governed by a handle G, whereby the activity of the fire in the space or chamber F and the amount of combustible and water pumped may be varied in accordance with the load or the amount of vapor which is to be produced or used. The exhaust vapor of the engine M may be discharged, as indicated by an exhaust pipe E² entering into the main exhaust opening E for the furnace gases. The admission of steam to the engine is controlled by the valve S¹ and the lever S².

To start the apparatus into operation, the plug P is taken out and heated to a temperature sufficient to easily vaporize oil coming in contact therewith, and is inserted in place after a torch has been applied to fire the oil at the opening; the air pump or oil pump A or O having been started and the water pump rendered inactive by shutting off its suction pipe by suitable valve, as at U, the heated air passing through the hot plug burns the oil in F, continuing the combustion until the part B is raised to a high temperature and the vaporizer V is at the boiling point or is sufficiently hot to make steam. The pumping up to this time can be done by extraneous power applied to the oil and air pump, and a separate water pump may be provided to work for the starting only. As soon however as the vaporizer V is hot, the engine M may be started by throwing on the water pump for a moment and by opening the valve U, after which the combustion of vapor for the generator continues and the engine M may now be made to furnish the pumping power.

Fig. 5 is a section of a form of air pump which might be replaced by any blast apparatus giving a definite volume of air at each stroke or during a definite traverse of the actuating shaft. Fig. 6 is a top view of the exterior of said pump; Fig. 7 is a section through the center, and Fig. 8 shows an interior view with the piston removed. It is hardly necessary to describe the details of this pump; suffice it to say that the two external heads of the cylindrical space inclosed, which heads are marked $H^1$ and $H^2$, are provided with openings covered with light valves opening inward, while light pistons $P^1$ and $P^2$ are attached to each other and oscillate backward and forward as driven by a crank pin moving in a slot, as shown. Pistons $P^1$ and $P^2$ also have light valves opening toward the inner space. An outlet pipe $A^1$ is affixed into the center of the case. The revolution of a shaft X, Fig. 6, throws the pistons $P^1$—$P^2$ backward and forward and causes them to displace the air toward the exit or air pipe $A^1$. The arrangement of the crank shaft is seen in Fig. 7, where the crank is shown in section, while the valves, which are merely flaps of flexible leather, are shown in Fig. 8 covering four openings.

The actions of the air-blowing apparatus are made coincidently with the motions of pump O, Fig. 9, which represents an oil pump driven by an eccentric on the same shaft if desired. The set of such pump, i. e., its pumping capacity, is made just such as will feed for each stroke the oil requisite to be burned by the air supplied by the air pump or blast cylinder, and the water pump W is in any like manner adjusted as to its pumping capacity to pump only that amount of water which the vaporizer can easily vaporize and slightly superheat. To vary the amounts of these fluids pumped it suffices to arrange speed-changing mechanism of any known type, as in Fig. 10, where a belt over two coned pulleys is shown, one of the coned pulleys being driven by the other; and the driven pulley being geared or connected to the shaft driving the pumps and air-blast apparatus. It need scarcely be stated that if the speed of the pumping apparatus be kept unchanged, i. e., if the speed-varying mechanism, Fig. 10, be dispensed with and the pumps themselves be made simultaneously variable in capacity, as by change of effective piston strokes or otherwise, the same result may be accomplished in increasing or decreasing the activity of the whole apparatus. Such an arrangement is shown in Fig. 11. W is the water pump, and O the oil pump, the pistons of which are driven from the same source of power. The capacity of the water pump is greater than that of the oil pump in order that fuel and water may be supplied to the fire chamber and generator in the proper amounts. Pivotally connected to the piston is a block or guide $W^1$ which engages the link $W^2$. The upper end of the link is pivotally united to an adjustable sliding piece $W^3$ carried by the fixed support $W^4$. The sliding piece is provided with a screw-threaded spindle, and by rotating the hand wheel $W^5$ the link can be adjusted so that its center of movement is raised or lowered to vary the extent of movement of the pump pistons. The lower end of the link is pivotally attached to an arm $M^1$ that is actuated by an eccentric on the shaft of the engine.

It is old in the art to vary the stroke of a pump piston by means of an adjustable link and block, such as described in connection with Fig. 11, hence no claim is made to that specific feature.

In order to vary the supply of air in accordance with the demand for energy on the generator, and simultaneously with the variations in fuel and water supplies, an air pump A is provided of suitable construction. I have chosen to illustrate a well-known type of pump as exemplified by the patent to George Westinghouse, Jr., No. 550,466, dated Nov. 26th, 1895, and hence do not claim its specific construction.

$A^3$ represents a pump casing having a dividing central wall $A^2$, the upper end of which acts as a guide for the vertically adjustable cylinder $P^5$. Air is admitted to the casing on one side of the partition and is discharged on the other. The cylinder has guides above and below, and is adapted to be moved from a concentric to a non-concentric position by the adjustable sliding piece $W^3$. In the cylinder are admission and discharge ports $P^6$ and $P^7$. Mounted within the cylinder is a revolving head $P^4$ in which the pistons $P^3$ are supported in such manner that each can move longitudinally to compensate for changes in position of the cylinder. The head is mounted on and is driven by the same shaft that drives the eccentric $M^2$ that actuates the fuel and water pumps. As shown the air pump as well as the fuel and water pumps are in the position to give maximum delivery. As the sliding piece $W^3$ is depressed by the hand wheel the amplitude of the pump strokes becomes less and less, and consequently the supplies of fuel water and air are simultaneously decreased. Moving the sliding piece upward from a given position of minimum pump output increases the deliveries of the pumps.

By stopping the action of the pumps the apparatus is thrown out of action, but the material in B remains hot enough to start even after a rest of many minutes in moderate sized structures, and after an hour's rest in larger sized structures, as there is no cooling draft or circulation, and the fire-resisting lining is made heavy enough to only slowly convey the heat away.

One of the features of my invention is that the oil, the water and the air are positively and definitely measured, and their flow is independent of the friction of the air passages, oil passages or water passages, so that no matter what the speed of the apparatus is they will bear a practically invariable relation to each other, or the feed of each will be positively produced. In this way the greater the call on the apparatus, the greater the amount of air, oil and water which will be pumped, and vice versa. There is no danger either of overheating the steam vaporizer part of the apparatus, inasmuch as when water ceases to be pumped in proper amount to keep the working temperature, the fire is accordingly checked simultaneously during actual operation.

I have illustrated and described in this application certain new and useful improvements in vaporizers and burners which are not claimed herein, as they form the subject matter of my Patent, No. 735,683, dated Aug. 4th, 1903.

The means employed to regulate the system by changing the speed of the pumps is not specifically claimed herein, as it forms the subject matter of a divisional application filed the 14th day of October, 1902, S. N. 127,227.

What I claim as new and desire to secure by Letters Patent of the United States is,

1. In a steam-generating system, the combination of a boiler capable of superheating steam, a burner, pumps for feeding water to the boiler and fuel to the burner, which pumps differ as to their capacities, pistons for the pumps which are mechanically connected, means for operating the pumps in a manner to preserve the relation between the capacities, and means which is independent of the operating means for simultaneously varying the capacities of the pumps while preserving their definite relation.

2. In combination with a steam-generating apparatus, two feed pumps, one for feeding water to the vaporizer and the other for feeding oil to the burner or fire space, a means for simultaneously varying the effective strokes of the pumps to compensate for changes in load on the generator, and mechanism for uniting the pumps in such manner that a definite relation between the feeding of the one and the feeding of the other is constantly maintained during all variations of capacity.

3. An apparatus of the kind described, comprising pumps for positively supplying air and liquid fuel to a fire chamber in measured proportions to insure complete combustion, an engine for driving the pumps, means acting on the driving connection between the pumps and the engine for simultaneously varying their capacities while preserving at all times the proportions for complete combustion; means for heating the air and oil and mixing them before they enter the fire chamber, and a steam generator or vaporizer receiving heat from the fire gases, and means for supplying water or other liquid under pressure in amount dependent upon the fuel used and air supplied at any time, substantially as described.

4. The combination of a steam generator wherein the heating power is supplied by a liquid fuel burner, a pump and connections for supplying water to the generator a pump and connections for supplying fuel to the burner, a pump and connections for supplying air to the burner, means for mechanically connecting the pump pistons whereby a definite feeding relation is maintained, and means for simultaneously varying the effective discharge of the pumps in order to vary the quantity of water supplied to the generator and the quantities of fuel and air supplied to the burner.

5. The combination with a steam generator wherein the heating power is supplied by a liquid fuel burner, of a pump and connections for supplying liquid fuel to the burner, a pump and connections for supplying water to the generator, means for driving the pumps, means for simultaneously increasing or decreasing the effective piston strokes of the pumps to cause corresponding variations in the supply of fuel and water furnished to the generator, and a means causing air to enter the fire space.

6. The combination with a steam generator wherein the heating power is supplied by a liquid fuel burner, of a pump and connections for supplying liquid fuel to the burner, a pump and connections for supplying water to the generator, means for driving the pumps, and a device acting on the connection between the means and the pumps for simultaneously and proportionately varying the feeding capacities of the pumps in a manner to cause corresponding variations in the supply of fuel to the burner and water to the generator.

7. In combination, a generator of the flasher type, a fire chamber, water, fuel and air pumps for supplying water to the generator and fuel and air to the fire chamber in predetermined amounts, means for driving the pumps, and a device in the driving connection between the means and the pumps for simultaneously changing the effective capacities of said pumps to vary the output of the generator.

8. In a vapor generating system, the combination of a vaporizer arranged to receive liquid and gradually increase its temperature to the point of vaporization and then superheat it, a pump and connection for supplying the necessary liquid to furnish the superheated vapor, a burner, a fuel pump, an air pump, connections from the fuel and air pumps which deliver their fluids unmixed at the burner, and a means for simultaneously changing the effective deliveries of all of the pumps to compensate for a given change in demand for superheated vapor.

9. In a system of regulation, the combination of an engine, a flash boiler arranged to supply steam thereto, a burner for the boiler, water and fuel pumps arranged to supply water to the boiler and fuel to the burner, driving mechanism between the engine and the pumps, means for simultaneously and correspondingly varying the feeding capacities of
5 the pumps, and a lever for manually actuating said means independently of the boiler pressure and the speed of the engine.

In witness whereof I have hereunto set my hand this 6th day of June, 1898.

ELIHU THOMSON.

Witnesses:
 DUGALD McKILLOP,
 HENRY O. WESTENDARP.